July 20, 1954 B. VONNEGUT 2,684,008
METHOD AND APPARATUS FOR MEASURING THE
CONCENTRATION OF CONDENSATION NUCLEI
Filed Nov. 23, 1949 2 Sheets-Sheet 1
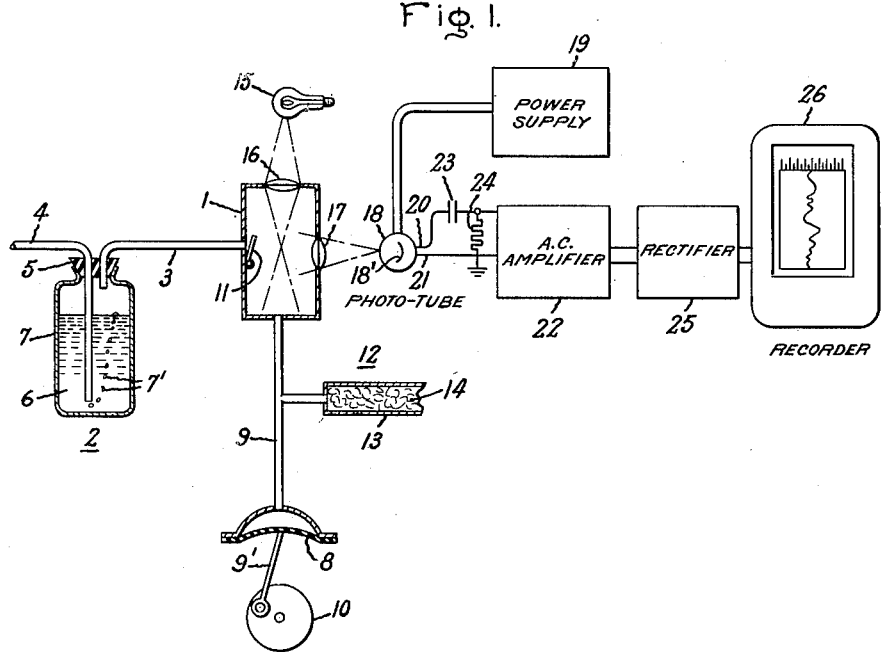
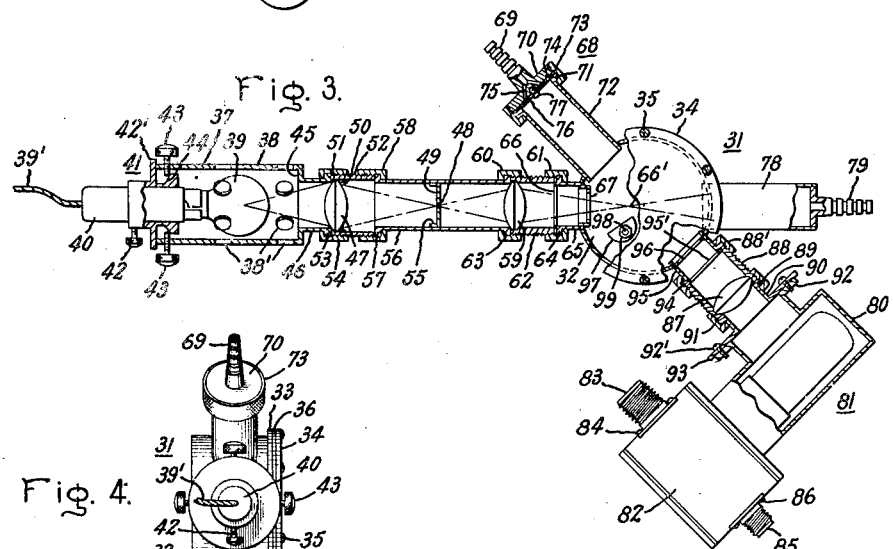
Inventor:
Bernard Vonnegut,
by Paul A. Frank
His Attorney.

July 20, 1954
B. VONNEGUT
2,684,008
METHOD AND APPARATUS FOR MEASURING THE
CONCENTRATION OF CONDENSATION NUCLEI
Filed Nov. 23, 1949
2 Sheets-Sheet 2
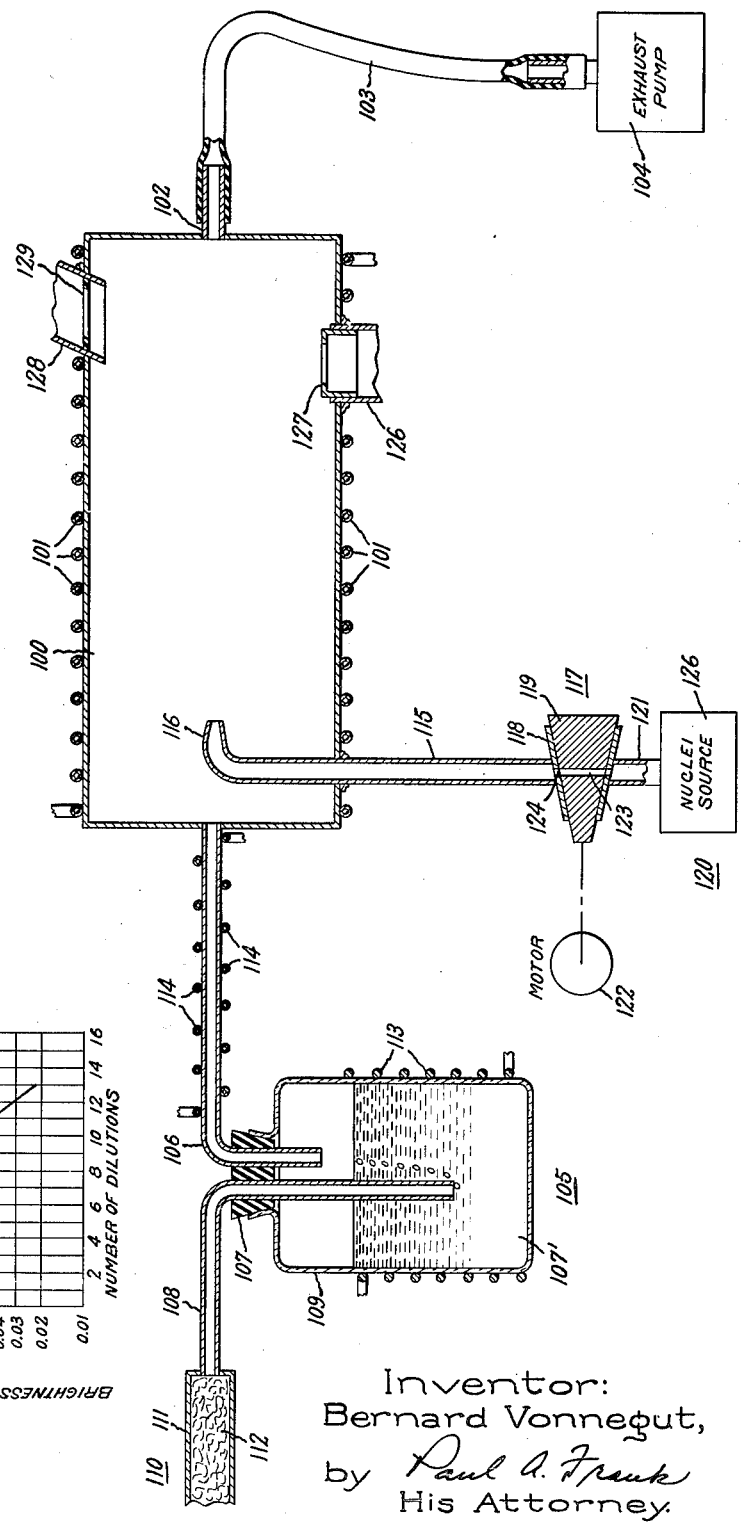
Inventor:
Bernard Vonnegut,
by Paul A. Frank
His Attorney.

Patented July 20, 1954

2,684,008

UNITED STATES PATENT OFFICE 2,684,008

METHOD AND APPARATUS FOR MEASURING THE CONCENTRATION OF CONDENSATION NUCLEI

Bernard Vonnegut, Alplaus, N. Y., assignor to General Electric Company, a corporation of New York Application November 23, 1949, Serial No. 129,091

10 Claims. (Cl. 88—14)

My invention relates to methods and apparatus for the measurement of the concentrations of condensation nuclei.

It has been observed heretofore that the condensation of aqueous vapor in air does not occur under ordinary circumstances in the absence of "condensation nuclei," even if the air is supersaturated with water vapor. These nuclei serve as centers for the formation of water droplets and, unless they are present, no condensation will occur, except at remarkable degrees of supersaturation. The nuclei are apparently microscopic and submicroscopic particles varying in size from atomic dimensions to 50 microns in diameter. The atmosphere always contains a large number of these nuclei, the lowest observed concentration being of the order of $10^3$ particles per cubic centimeter and the largest, many times this value. They apparently originate in processes that produce hygroscopic substances in dispersed form, ions, or capillary surfaces. The principal natural sources for the nuclei are evaporation of oceanic water, dust storms, radioactive radiation, ions from lightning, and volcanic eruptions. The principal sources resulting from human activity are pollution due to combustion processes, exhaust gases from internal combustion engines, X-rays and other forms of electromagnetic radiation.

The ability to measure the absolute number or concentration of these nuclei quickly and accurately has been extensively sought for the purpose of obtaining very useful data in the study of meteorological phenomena, as well as in the study of the various human activities which evolve these nuclei. Since the nuclei are so small, however, their detection is difficult. It is not possible to measure their numbers or concentration by the usual techniques because since they are small relative to the wave length of visible light, they have very little effect either in absorbing or in scattering radiation.

It has been proposed heretofore to accomplish detection of these nuclei by employing them as centers for condensation and thereby obtaining a nuclei "amplification." When condensation occurs on a nucleus about 50 angstroms in diameter, it grows to a particle of perhaps 10 microns in diameter. This means that the original nucleus has grown in weight by a factor of perhaps 10 billion, and therefore has reached a size which is more conducive to detection. One means heretofore suggested for detecting nuclei in this fashion comprises the production of conditions in which condensation actually occurs so that a water droplet forms about each nucleus, thereby producing a cloud of water droplets. Thereafter a beam of light is passed through this cloud and the diminution of the intensity of the beam in passing therethrough is employed as a measure of the concentration of the nuclei. For all except the highest concentrations of nuclei, however, the diminution of light intensity in passing through a cloud of this nature is so small that, in order to obtain a measurable effect, it is necessary to employ a very long absorption cell. Within the range of reasonable physical dimensions such means has a useful sensitivity extending over only a very small range of concentration. Another heretofore suggested means employing nuclei "amplification" comprises apparatus in which water droplets formed by condensation on the nuclei are precipitated upon a stage where they may be counted through a microscope. As will be readily appreciated, the counting of individual water droplets through a microscope is a slow and tedious process and, moreover, accurate results may not be obtained unless the droplets precipitated and counted are related in some fashion to the total number in the cloud.

From my investigations I have found that, if a cloud of droplets produced by condensation is irradiated with light, the intensity of the radiation scattered by the cloud is approximately proportional to the concentration of the nuclei about which the droplets form. Furthermore, I have found that, by forming the clouds periodically, it is possible to generate a periodic component of radiation, scattered by the cloud, which may be readily detected to the exclusion of stray or direct radiation from the source. Thus, in accordance with my invention I periodically condense a substance, such as water vapor, about the nuclei as condensation centers to form a cloud of droplets, irradiate the clouds, and measure the intensity of the radiation scattered by the clouds. In this way I am able to secure a fast, reliable, and accurate determination of a wide range of concentrations of nuclei within one sample or a successive number of samples employed periodically.

The aspects of my invention which I desire to protect herein are pointed out with particularity in the appended claims. The invention itself, together with further objects and advantages thereof may best be understood by reference to the following description taken in connection with the accompanying drawings in which Fig. 1 is a diagrammatic view illustrating apparatus suitably embodying the invention; Fig. 2 is a graph useful in explaining the invention; Fig. 3 is a fragmentary view, partly in section, showing a preferred mechanical construction suitably embodying features of the invention; Fig. 4 is an end view taken from the left of Fig. 3; and Fig. 5 is a partially diagrammatic, partially sectionalized view of alternative apparatus suitably embodying features of the invention.

The principles of my invention may be more fully explained by reference to the diagrammatic view of Fig. 1 wherein there is shown an airtight container 1 in which a substance may be condensed about condensation nuclei as condensation centers. Means for admitting a mixture of condensation nuclei, a compressible gas and a condensing substance comprises a bubbler humidifier 2 connected to container 1 through a section of tubing 3. For present purposes it may be assumed that the condensation nuclei, the concentration of which is to be measured, are present in the atmosphere and that air is the compressible gas which is humidified and admitted along with the nuclei into the airtight container 1. Air and nuclei are drawn through a section of tubing 4 which serves as an intake and extends through a stopper 5 into a humidifying liquid 6, such as water, contained within a vessel 7. The air and the nuclei emerge from the bottom of the intake tube 4 and pass upward in bubbles 7' through the water. As will be well understood by those skilled in the art, the air passing through the humidifying liquid absorbs vapor and thus is humidified. After the humidified air reaches the top of the liquid in container 7, it is drawn through tubing section 3, which extends through stopper 5, into airtight container 1.

In order to vary the pressure within container 1 for the purpose of drawing the humidified air and nuclei into container 1 and thereafter expanding the air, there is provided a flexible bellows 8 connected to container 1 through a section of tubing 9. The expansion may be accomplished periodically by attaching bellows 8 to a shaft 10 of a constant speed motor (not shown) through an eccentric shaft 9'. The admission of the humidified air and nuclei into container 1 may be controlled by means of a pressure responsive valve 11, a suitable construction of which will be described later in connection with Figs. 3 and 4. Means for exhausing the humidified air and nuclei after expansion may comprise a filter 12 constructed of a section of tubing 13 connected to tubing section 9 and having within its bore a portion of glass or cotton wool 14.

When motor shaft 10 revolves, bellows 8 is alternately expanded and compressed, thereby periodically expanding and compressing air within container 1. During any one cycle, the following sequence of events occurs. As bellows 8 begins to expand, pressure responsive valve 11 opens due to a greater pressure on its exterior surface whereby a sample of humidified air and nuclei is drawn into container 1 in a manner hereinbefore described. Thereafter, as bellows 8 continues to expand, the air within container 1 is expanded and adiabatically cooled below its dew point or supersaturated, and droplets of condensation are formed about the nuclei which are present. Valve 11 may be arranged to admit only a given quantity of humidified air and nuclei in order to permit the desired expansion within chamber 1. After bellows 8 is fully expanded, it is then compressed by the force of shaft 9, thereby compressing the air within chamber 1 and closing valve 11. As the air is compressed in container 1, the droplets are evaporated, and the sample is expelled or exhausted through filter 12. The glass or cotton wool 14 serves as a resistance to flow and its length may be arranged to prevent excessive amounts of air from being drawn into chamber 1 during the expansion stroke of bellows 8 while permitting expulsion of the sample during the compression stroke. Any air that may be drawn in will be nuclei-free due to its passage through the glass or cotton wool 14 and thus will not affect the operation deleteriously. It will now be understood that during each cycle a sample of humidified air and nuclei is admitted to container 1, expanded to form a cloud of droplets about the nuclei as condensation centers, and then compressed and exhausted. Since this sequence of events occurs periodically, a cloud of droplets is periodically formed within container 1.

In order to irradiate the clouds of droplets periodically formed with container 1, there is provided a tungsten filament lamp 15 which may be energized in conventional fashion by a suitable source of constant electric power (not shown). Light emanating from lamp 15 is directed through a converging lens 16 disposed in the side of container 1. As will be more fully described hereinafter, the beam of light which is directed through lens 16 and focused within container 1 is periodically scattered by the cloud of droplets formed within chamber 1. A portion of the periodically scattered light is directed through a converging lens 17 to a light sensitive cathode 18' of a phototube 18 which may be energized in a conventional manner by a source of direct current power 19. The output currents of phototube 18 are supplied through conductors 20 and 21 to a conventional resistance-capacity coupled alternating current amplifier 22 which has a blocking capacitor 23 and a grid resistor 24 in its initial stage as shown. The output currents of amplifier 22 are rectified by a rectifier 25 which in turn is connected to a recorder 26.

As has been mentioned previoussy, I have found that, if a cloud of droplets produced by condensation is irradiated with light, the intensity of the scattered light is approximately proportional to the concentration of nuclei about which the droplets form. This statement, however, presumes that other factors are maintained constant. Such scattered light is primarily a function of the size of the droplets which form the cloud. In turn, the size of the droplets is determined by the concentration of the condensing substance, the supersaturation of the condensing substance, the frequency of the condensing cycle, the temperature of the chamber in which the droplets are formed, and the concentration of the nuclei. That the above described apparatus may be employed to measure the intensity of the scattered light as a function of only the concentration of the nuclei will be apparent from the following.

In the foregoing description of the apparatus illustrated in Fig. 1, it has been shown that during each cycle a sample of humidified air and nuclei is admitted to container 1, expanded sufficiently to form a cloud of droplets about the nuclei as condensation centers, and then compressed and exhausted. Assuming that the ambient temperature is relatively constant, it will be obvious that the temperature of container 1 remains relatively constant. If the ambient temperature is not constant, container 1 may be placed within a suitable constant temperature enclosure in a manner well known to those skilled in the art. Furthermore, the expansion and compression cycle is constant because bellows 8 is operated at a constant rate. Moreover, since valve 11 may be arranged to admit into airtight container 1 the same amount of sample during each cycle and since each sample is humidified in the same manner, the concentration and supersaturation of the condensing substance will remain essentially constant. The only factor remaining to determine the intensity of the scattered light is, therefore, the concentration of the nuclei, and this is precisely the variable which it is desired to measure.

The measurement of the intensity of the radiation scattered by the clouds is accomplished through the use of phototube 18. As is well understood by those skilled in the art, a properly energized phototube generates an electric current output which is proportional to the amount of light impinging upon its light sensitive cathode. Therefore, since the amount of the light received by cathode 18' is proportional to the intensity thereof, the output of phototube 18 is proportional to the intensity of the impinging light. The intensity of the light scattered by the clouds is dependent upon the angle at which it is viewed, but this may be accounted for by proper calibration.

In measuring the light scattered by an irradiated cloud in this fashion, there is always some light from the source used to illuminate the cloud, which, by reflection from the interior of the apparatus or by reflection from dirt on the lenses of the optical system, finds its way into the phototube. If the total current output of the phototube is measured, this quantity represents the sum of the light which is scattered from the cloud plus the light reflected from the container in which the clouds are formed plus the dark current of the phototube. If the concentration of the cloud droplets is small, the light scattered by the droplets may be small in relation to the light reflected from the container and the dark current. In such event, it would be difficult to measure small concentrations of nuclei.

In the above described apparatus, however, the cloud is formed periodically within container 1, and therefore the light which is scattered thereby is of periodic intensity. The output of phototube 18 varies in accordance therewith and, since such output is supplied through an alternating current amplifier 22 and rectifier 25 to a recorder 26, only the intensity of the periodic component scattered by the clouds is measured, the direct current component of the output of phototube 18 due to the reflected light and dark current being blocked by capacitor 23. By this means the direct current background is eliminated and the sensitivity of the apparatus is greatly increased. Even aerosol particles, which are large enough to scatter light, do not affect the measurements unless they serve as nuclei and thereby periodically change their light scattering properties as the condensing substance periodically condenses and evaporates on them.

It has been mentioned heretofore that there is a dependence of the intensity of the radiation scattered by the clouds upon the angle at which it is viewed, i. e. the angle at which phototube 18 is positioned with respect to the beam of light emanating from source 15. While the intensity is essentially constant around the illuminating beam, it is generally, with the size of droplets usually obtained, stronger in the forward direction than in the backward direction of the illuminating beam. As shown in Fig. 1, phototube 18 is positioned to view the scattered radiation at an angle of about 90° with respect to the illuminating beam, but better sensitivity may be obtained by placing the phototube at an angle of approximately 45° in the forward direction as shown in Figs. 3 and 4. Increased intensity may be obtained by positioning the phototube more directly in line with the illuminating beam, providing stray radiation does not increase too greatly and saturate the phototube.

The graph in Fig. 2 illustrates the response which may be obtained according to the invention. The brightness of the cloud of droplets or the intensity of the light scattered therefrom is plotted in foot lamberts on a logarithmic scale versus the number of dilutions with nuclei-free air of a given sample plotted on a linear scale. It will be noted that the curve is nearly linear except at the higher concentrations. The non-linearity at higher concentrations may result from the competition of the growing droplets for the available supply of condensing substance. It may also result from absorption due to a dense cloud at very high concentrations. At ordinary concentrations, light absorption by the cloud is very small and of no consequence.

Reference will now be had to Figs. 3 and 4 wherein there is shown a preferred mechanical construction suitably embodying principles of my invention hereinbefore described. An airtight container 31 into which condensation nuclei and a humidified gas may be introduced for the formation of clouds of condensation comprises a hollow cylindrical portion 32, closed at one end and having a flange 33 and cover plate 34 which may be secured to flange 33 by means of screws 35. A cylindrical gasket 36 of a material such as rubber may be inserted between the cover plate 34 and flange 33 to prevent leakage of air into container 31.

Means for irradiating with a beam of light the clouds formed within container 31 comprises a lamp assembly 37 having a hollow shield portion 38 which encloses a tungsten filament lamp 39 suitably energized through a lead 39'. Holes 38' may be provided in shield portion 38 to permit dissipation of heat from lamp 39. Lamp 39 is supported in a conventional bayonet type base 40 which is slidably secured by means of a locking screw 42 to permit focus adjustment within a member 41. Member 41 has a flange portion 42' which abuts the end of shield portion 38. Screws 43, which engage threads in shield member 38, bear against an angular shoulder 44 upon member 41, thereby serving as axial centering screws for lamp 39. The light emanating from lamp 39 is directed through an opening 45 within shield portion 38 and is confined by means of a hollow cylindrical section 46 which may be formed integrally with shield portion 38. The light passes through a converging lens 47 and is focussed on a circular hole 48 within a disc 49. Lens 47 is supported between shoulders 50 and 51 upon a threaded sleeve 52 which abuts a shoulder 53 upon cylindrical section 46. Sleeve 52 may be held in position by a threaded collar 54 which engages shoulder 53. Metal disc 49 is retained in position relative to lens 47 by means of a flange 55 which engages the interior surface of a hollow cylindrical sleeve 56. A shoulder 57 upon sleeve 56 abuts threaded sleeve 52 and is secured thereto with a threaded collar 58.

The light emanating from lamp 39 and passing through lens 47 to be focused upon hole 48 within disc 49 serves as a point source for a converging lens 59. The surface of disc 49 which faces lamp 39 may be painted with black paint or graphite to decrease the possibility of stray light deleteriously affecting the point source. Lens 59 is supported in a similar manner to lens 47 by means of threaded collars 60 and 61 and threaded sleeve 62 which abuts a shoulder 63 upon sleeve 56. Lens 59 is cemented in position in order to prevent unwanted air from being drawn into container 31. Sleeve 62, at the end opposite that which engages lens 59, abuts a shoulder 64 upon a sleeve 65. A circular gasket 66, of a material such as rubber, may be inserted between shoulder 64 and the abutting end of sleeve 62 to prevent leakage. Sleeve 65 is secured by any convenient means such as soldering or brazing within an opening in container 31 as shown. As stated heretofore, disc 49 creates a point source for lens 59, which focusses the light at a convenient point 66' within container 31. A diaphragm 67, consisting of a metal disc having an oval hole therein, may be suitably attached to sleeve 65 for the purpose of removing stray light.

For the purpose of admitting samples of nuclei and a humidified gas into container 31, there is provided an intake assembly 68 which comprises a nozzle 69 to which a bubbler humidifier (not shown) may be conveniently attached, as described in connection with Fig. 1. Nozzle 69 has a threaded base flange 70 which is retained in position against a shoulder 71 of a sleeve 72 by means of a threaded collar 73. A circular gasket 74 of a material such as rubber may be inserted between flange 70 and shoulder 71 to prevent leakage. A pressure responsive valve of the flutter type may be employed to control the passage of humidified gas and nuclei into container 31 through holes 75 in flange 70 and may comprise a circular disc 76 of a material such as rubber. Disc 76 may be secured to flange 70 in a position traversing holes 75 by means of a screw 77. As will readily appear, the thickness of disc 76 may be arranged so that when a certain pressure differential exists across it, it will move inward to allow a desired amount of nuclei-laden air to pass through hole 75 into container 31.

For the purpose of securing the desired periodic pressure variations within container 31 to form clouds of droplets, there is provided a hollow cylindrical member 78 suitably secured at one end within an opening in the portion 32 of container 31, as shown. Attached to the other end of member 78 is a nozzle 79 to which may be connected a pressure-varying means (not shown), such as bellows 9 described in connection with Fig. 1. Member 78 may be covered on its interior surface with a coating of black paint or graphite in order to serve as trap for the direct light traversing container 31.

In order to detect and measure light scattered by clouds periodically formed within container 31, there is shown a phototube 80 suitably mounted at about an angle of 45° with respect the illuminating beam formed at 66 within an enclosure 81 having a base member 82. Power may be supplied to phototube 80 through a conventional connector 83 attached to the base member 82 by means of screws 84. The output of phototube 80 may be obtained through a conventional connector 85 connected to base member 82 by means of screws 86, such output being conducted by suitable leads to an A.-C. amplifier (not shown) as described in connection with Fig. 1. Light is directed to phototube 80 through a converging lens 87 supported within a threaded sleeve 88 which abuts a shoulder 89 of a cylindrical sleeve 90. Lens 87 is cemented in position to prevent leakage of air into container 31. Sleeve 90 is attached to a washer-shaped member 93 and is retained in position with respect to sleeve 88 by means of a threaded collar 91. Washer-shaped member 93 is secured to a flange 92, which may be formed integrally with enclosure 81 as shown, by means of screws 92'. Threaded sleeve 88 is held, by means of a threaded collar 88', against a shoulder 94 upon a sleeve 95 which is disposed within an opening in portion 32 of container 31. To prevent leakage of air into container 31, a rubber gasket 95' may be inserted between shoulder 94 and sleeve 88. A diaphragm 96, consisting of a metal disc having an oval hole therein, may be positioned within sleeve 95 to reduce the entrance therein of random light scattered from the walls of container 31. As a further aid to the reduction of such random light, the inside surfaces of container 31 may be covered with black paint or graphite and an L-shaped metal member 97 attached to the bottom of portion 32, as shown, by means of a stud 98 and nut 99.

In Fig. 5 there is shown exemplary alternative apparatus suitable for measuring the concentration of condensation nuclei in accordance with the principles of my invention. Means within which clouds of droplets may be formed comprises an airtight container 100 which is maintained at an essentially constant temperature by means of suitably insulated current carrying coils 101 energized in a convenient manner. A thermostatic control of a conventional type may be employed to assure a constant temperature within container 100 if such is deemed desirable. In order to provide means for drawing humidified air and nuclei through container 100, the admission of which will be described presently, there is shown a nozzle 102 attached to container 100 by soldering or brazing. A section of flexible tubing 103 of a material such as rubber may be employed to connect a conventional exhaust pump 104 to nozzle 102.

In order to admit humidified air into container 100 there is provided a bubbler humidifier 105 which comprises a tubing section 106, extending through a stopper 107 and connected to container 100 as shown. Air is drawn through a tubing section 108 which serves as an intake and extends through stopper 107 into a humidifying liquid 107', such as water, contained within a vessel 109. A filter 110 comprising a section of tubing 111 filled with glass or cotton wool 112 serves as a means of removing nuclei from the air drawn through humidifier 105. As will be readily understood, the nuclei-free air drawn through humidifier 105 is humidified and admitted into container 100 through tubing section 106. Insulated current carrying coils 113 and 114, conveniently placed respectively about vessel 109 and tubing section 106, may be employed to maintain the humidified air at a substantially constant temperature. If desired, a suitable thermostatic control may be employed to assure such a constant temperature.

For the purpose of admitting nuclei into container 100 there is shown a section of tubing 115 which extends through the wall of container 100 and terminates in a nozzle 116 directed toward nozzle 102. Tubing section 115 may be attached to container 100 by any convenient means such as soldering or brazing. Connected to the end of tubing section 115 opposite nozzle 116 is a periodically operable valve 117 which may comprise an outer conical sleeve 118 and a rotatable inner conical member 119. Opposite the connection of tubing section 115, a source of nuclei 120 may be connected to sleeve 118 by means of a tubing section 121. A constant speed motor 122 may be attached to member 119, as is diagrammatically illustrated. Holes 123 and 124 are diametrically positioned in sleeve 119 and member 118 respectively to provide a passage between nuclei source 120 and tubing section 115 as member 119 is rotated by motor 122.

In operation, exhaust pump 104 serves to draw nuclei-free air through humidifier 105 and thence through container 100 in a continuous flow. The nuclei-free air drawn through humidifier 105 is maintained, by means of coils 113 and 114, at a desired temperature higher than the temperature which is maintained within container 100 by means of coils 101. As mentioned heretofore, essentially no condensation occurs within chamber 100 under these circumstances, even though the air drawn through humidifier 105 is suddenly cooled by entrance into chamber 100, because no condensation nuclei are present to enable droplets to form. However, when member 119 is rotated by motor 122, nuclei source 120, which may comprise a closed vessel 125 containing nuclei-laden air at a pressure slightly above that within container 100, is periodically connected to container 100 thereby causing nuclei to be introduced periodically therein. Each time a sample of nuclei is thus introduced, a cloud of droplets is formed about the nuclei. The clouds formed successively and periodically pass through container 100 and are exhausted by pump 104. For the purpose of irradiating the periodically formed clouds a source of radiation and an optical system similar to that described in connection with Figs. 3 and 4 may be employed and may comprise a sleeve 126 and a diaphragm 127 suitably inserted through the wall of container 100. To detect the radiation scattered by the clouds, which may be considered as a stratified cloud passing through container 100, a phototube and optical system similar to that described in connection with Figs. 3 and 4 may be employed and may comprise a sleeve 128 and a diaphragm 129 suitably inserted through the wall of container 100.

The foregoing description of the embodiments of the invention has been concerned primarily with the use of water as the condensing substance from which the droplets are formed on the nuclei. The phenomenon of condensation from the vapor phase of a liquid or solid on a nucleus is not, however, confined to water but is a general property of all condensation processes from a gas. It is, therefore, within the contemplation of the invention to employ other suitable condensing substances which may occur to those skilled in the art.

Almost any gas can be used as the atmosphere in which condensation takes place. The choice of atmosphere is, in general, determined by the atmosphere in which nuclei to be investigated are suspended. When the system to be investigated permits choosing the atmosphere, hydrogen and helium have the advantage that a smaller background of droplets formed by spontaneous nucleation is encountered.

As explained in connection with Fig. 1, an ordinary tungsten filament lamp is suitable for source 15. The average energization of the source should be constant and may be accomplished with alternating current, providing the frequency of such current is sufficiently different from the periodic component of scattered light to permit its filtering from the output of phototube 18 in a conventional manner. It is preferable to employ a source of constant direct current. It has been found that the intensity of radiation scattered by the clouds when a tungsten filament lamp is employed is sufficiently great under most circumstances to provide adequate sensitivity for the apparatus. In general, however, the shorter wavelength components are more strongly scattered and, therefore, it is contemplated that suitable sources of shorter wavelength radiation may be employed. If such a source is employed, phototube 18 may be replaced by a radiation sensitive device suitable for the detection of such shorter wavelength radiation.

While it is preferable to focus the light emanating from source 15 as described in connection with Figs. 1, 3 and 4, this is not essential to satisfactory operation of the apparatus. Focussing the light at a convenient position within the airtight container facilitates reduction of stray light and improves the sensitivity of the apparatus. It should also be observed that any form of pressure responsive valve may be employed in lieu of filter 12 to permit expulsion of used samples while preventing the inward flow of air during the expansion of bellows 8. Moreover, it will be apparent that rectifier 25 and recorder 26 may be replaced by alternative apparatus suitable for obtaining a desired visible indication of the output of amplifier 22.

While the invention may be adapted to a variety of uses, it may be specifically noted that it is very well suited for the measurement of smokes having a small particle size. In such manner the presence of smokes may be detected and the efficiency of smoke filters may be measured.

While the invention has been described with reference to particular embodiments thereof, it will be understood that numerous changes may be made without departing from the invention. I therefore aim in the appended claims to cover these and all such equivalent variations of application and structure as are within the true spirit and scope of the foregoing disclosure.

What I claim as new and desire to secure by Letters Patent of the United States is:

1. The method of determining the concentration of condensation nuclei of a size that have little or no absorption or scattering effect on visible radiation which comprises admitting a mixture of the nuclei and a condensible substance into an airtight container, controlling the pressure, volume and temperature conditions of the substance to periodically condense said substance about the nuclei as condensation centers to form periodically a cloud of droplets, irradiating said clouds, and measuring the intensity of the scattered radiation from said clouds, the intensity of the scattered radiation being an indication of the concentration of the condensation nuclei.

2. The method of determining the concentration of condensation nuclei of a size that have little or no absorption or scattering effect on visible radiation which comprises admitting a mixture of the nuclei, a compressible gas and a condensing substance into an airtight container, periodically expanding said gas within said container to condense said substance about said nuclei to form periodically a cloud of droplets, irradiating said clouds of droplets, and measuring the intensity of radiation scattered by said clouds, the intensity of such radiation being an indication of the concentration of the condensation nuclei.

3. The method of determining the concentration of condensation nuclei of a size that have little or no absorption or scattering effect on visible radiation which comprises humidifying a mixture of the nuclei and a compressible gas, admitting said humidified mixture into an airtight container, periodically expanding said gas within said container to form a cloud of droplets having the nuclei as condensation centers, irradiating said clouds of droplets, and measuring only the intensity of the radiation scattered by the periodical appearance of said cloud, the intensity of such radiations being an indication of the concentration of the condensation nuclei.

4. The method of determining the concentration of condensation nuclei of a size that have little or no absorption or scattering effect on visible radiation which comprises filtering a gas sample to remove all condensation nuclei therefrom, humidifying said filtered sample of gas, and passing the resulting nuclei-free humidified gas through a container maintained at a temperature below the saturation temperature of said gas, periodically admitting condensation nuclei into said container to form a stratified cloud of droplets about said nuclei as condensation centers, irradiating said stratified cloud of droplets, and measuring the intensity of radiation scattered by said cloud, the intensity of radiation being an indication of the concentration of condensation nuclei.

5. The method of continuously determining the concentration of condensation nuclei of a size that have little or no absorption or scattering effect on visible radiation which comprises periodically admitting samples consisting of a mixture of the nuclei, a compressible gas and a condensing substance into an airtight container, expanding each of said samples within said container to condense said substance about the nuclei to form periodically a cloud of droplets, exhausting each of said samples following its expansion, irradiating said clouds of droplets, and measuring the intensity of radiation scattered by said clouds, the intensity of such radiation being an indication of the concentration of the condensation nuclei.

6. Apparatus for determining the concentration of condensation nuclei of a size that have little or no absorption or scattering effect on visible radiation which comprises an airtight container, means for introducing a humidified gas and condensation nuclei into said container, gas treating means for controlling the condensation conditions of the gas for forming periodically within said container a cloud of droplets about the nuclei as condensation centers, a source of radiation for traversing said container with a beam of radiation whereby the periodic appearance of said cloud scatters the radiation from said source, radiation sensitive means in the path of the radiation scattered periodically by said cloud for generating a periodic electric current proportional to the intensity of said scattered radiation, and means responsive to said periodic electric current for indicating the magnitude of said current, the magnitude of the electric current being an indication of the concentration of the condensation nuclei.

7. Apparatus for determining the concentration of condensation nuclei of a size that have little or no absorption or scattering effect on visible radiation which comprises an airtight container, gas treating means for periodically expanding and compressing gas within said container, a source of condensation nuclei and a humidified gas connected to said container, a pressure responsive valve traversing the connection of said source to said container to admit a sample of said condensation nuclei and said humidified gas into said container during each of said periodic expansions whereby a cloud of droplets may be formed periodically about said nuclei within said samples during expansion and evaporated during compression, means for exhausting each sample after expansion, a source of radiation for traversing said container with a beam of radiation, said periodically formed cloud of droplets being effective to scatter the radiation emanating from said source of radiation, radiation sensitive means in the path of the radiation scattered periodically by said cloud of droplets for generating a periodic electric current proportional to the intensity of said scattered radiation, said radiation sensitive means receiving concurrently with said periodic scattered radiation a substantially constant component of stray radiation from said source, and circuit means connected to said radiation responsive means for indicating only the magnitude of said periodic electric current.

8. Apparatus for determining the concentration of condensation nuclei of a size that have little or no absorption or scattering effect on visible radiation which comprises means for producing a humidified nuclei-free gas maintained at a substantially constant temperature, an airtight container maintained at a substantially constant temperature below that of said humidified gas in said source, means for passing said humidified gas into said container, means for admitting condensation nuclei to be counted into said container at periodic intervals whereby clouds of droplets are formed periodically and successively within said container, a source of radiation for irradiating the interior of said container with a beam of radiation, said periodically formed clouds of droplets being effective to scatter the radiation emanating from said source of radiation, radiation sensitive means in the path of the radiation scattered periodically by said clouds of droplets for generating a periodic electric current proportional to the intensity of said scattered radiation, and circuit means connected to said radiation responsive means for indicating only the magnitude of said periodic current which is an indication of the concentration of the condensation nuclei.

9. Apparatus for determining the concentration of condensation nuclei of a size that have little or no absorption or scattering effect on visible radiation which comprises means for producing a humidified nuclei-free gas maintained at a substantially constant temperature, an airtight container maintained at a substantially constant temperature below that of said humidified gas through said container, a source of condensation nuclei, means for admitting said nuclei into said container at periodic intervals to form clouds of droplets periodically and successively within said container, a source of radiation for irradiating the interior of said container with a beam of radiation, said periodically formed clouds of droplets being effective to scatter the radiation emanating from said source of radiation, radiation sensitive means in the path of the radiation scattered periodically by said cloud of droplets for generating a periodic electric current proportional to the intensity of said scattered radiation, an alternating current amplifier connected to said radiation responsive means for amplifying only said periodic current, and recording means connected to said amplifier for recording the magnitude of said amplified periodic current, to thereby indicate the concentration of the condensation nuclei.

10. Apparatus for determining the concentration of condensation nuclei of a size that have little or no absorption or scattering effect on visible radiation which comprises an airtight container, means for introducing a humidified gas and condensation nuclei into said container, means for controlling the condensation condition of the gas for condensing the gas about the nuclei as condensation centers to form clouds of droplets of varying concentration, a source of radiation for traversing said container with a beam of radiation whereby the clouds of varying concentration scatter the radiation, radiation sensitive means in the path of the scattered radiations for developing a varying electric signal which follows the variations in intensity of the scattered radiations, and means coupled to said radiation sensitive means and responsive to said varying electric signal for indicating the magnitude of said signal, to provide an indication of the concentration of the condensation nuclei.

References Cited in the file of this patent

UNITED STATES PATENTS

| Number | Name | Date |
| --- | --- | --- |
| 1,746,525 | Darrah | Feb. 11, 1930 |
| 2,429,474 | McMahon | Oct. 21, 1947 |
| 2,486,622 | White | Nov. 1, 1949 |
| 2,566,307 | Boyle | Sept. 4, 1951 |

FOREIGN PATENTS

| Number | Country | Date |
| --- | --- | --- |
| 417,116 | Great Britain | Sept. 28, 1944 |

OTHER REFERENCES

Atomic Physics Text by Blackwood et al. "The Cloud Chamber," pages 228–231, publ. 1937 by John Wiley & Sons, New York.